(12) United States Patent
Lee et al.

(10) Patent No.: US 10,107,474 B2
(45) Date of Patent: Oct. 23, 2018

(54) LENS MODULE AND LIGHT EMITTING DIODE PACKAGE INCLUDING THE SAME

(71) Applicant: LG INNOTEK CO., LTD., Seoul (KR)

(72) Inventors: Jung Ho Lee, Seoul (KR); Seong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 157 days.

(21) Appl. No.: 15/027,839

(22) PCT Filed: Oct. 7, 2014

(86) PCT No.: PCT/KR2014/009412
§ 371 (c)(1),
(2) Date: Apr. 7, 2016

(87) PCT Pub. No.: WO2015/053527
PCT Pub. Date: Apr. 16, 2015

(65) Prior Publication Data
US 2016/0265739 A1 Sep. 15, 2016

(30) Foreign Application Priority Data

Oct. 7, 2013 (KR) .................. 10-2013-0119298
Dec. 2, 2013 (KR) .................. 10-2013-0148574

(51) Int. Cl.
*F21V 5/04* (2006.01)
*G02B 19/00* (2006.01)
(Continued)

(52) U.S. Cl.
CPC .............. *F21V 5/04* (2013.01); *F21S 41/141* (2018.01); *F21S 41/29* (2018.01); *F21S 43/14* (2018.01);
(Continued)

(58) Field of Classification Search
CPC .......... F21V 5/04; F21V 17/06; F21V 17/101; F21S 43/14; F21S 43/27; F21S 41/141;
(Continued)

(56) References Cited

U.S. PATENT DOCUMENTS

2008/0151547 A1 6/2008 Grotsch et al.
2011/0057557 A1 3/2011 Chi et al.
(Continued)

FOREIGN PATENT DOCUMENTS

CN 101175943 A 5/2008
CN 103403444 A 11/2013
(Continued)

OTHER PUBLICATIONS

Extended European Search Report dated Oct. 14, 2016 in European Application No. 14852517.3.
(Continued)

*Primary Examiner* — Mary Ellen Bowman
(74) *Attorney, Agent, or Firm* — Saliwanchik, Lloyd & Eisenschenk

(57) ABSTRACT

Provided are a lens module and a light emitting diode package including the lens module, the lens module, including: a lens part; support parts extending from the outside of the lens part; and connection parts formed on the support parts, respectively.

28 Claims, 8 Drawing Sheets

(51) Int. Cl.
    *F21V 17/06*     (2006.01)
    *F21V 17/10*     (2006.01)
    *F21S 41/141*     (2018.01)
    *F21S 41/29*     (2018.01)
    *F21S 43/14*     (2018.01)
    *F21S 43/27*     (2018.01)
    *F21Y 115/10*     (2016.01)

(52) U.S. Cl.
    CPC .............. *F21S 43/27* (2018.01); *F21V 17/06* (2013.01); *F21V 17/101* (2013.01); *G02B 19/0019* (2013.01); *G02B 19/0061* (2013.01); *F21Y 2115/10* (2016.08)

(58) Field of Classification Search
    CPC . F21S 41/29; G02B 19/0019; G02B 19/0061; F21Y 2115/10
    See application file for complete search history.

(56) References Cited

U.S. PATENT DOCUMENTS

| | | |
|---|---|---|
| 2011/0273876 A1 | 11/2011 | Stolyar et al. |
| 2012/0243239 A1 | 9/2012 | Fukui et al. |

FOREIGN PATENT DOCUMENTS

| | | | |
|---|---|---|---|
| JP | 2007-059489 A | | 3/2007 |
| JP | 2008-511143 A | | 4/2008 |
| JP | 2009-071186 A | | 4/2009 |
| JP | 2009230984 A | | 10/2009 |
| JP | 2009-541949 A | | 11/2009 |
| JP | 2012059367 A | * | 3/2012 |
| JP | 2012059367 A | | 3/2012 |
| JP | 2012252890 A | | 12/2012 |
| KR | 20120003084 A | | 1/2012 |
| WO | WO-2008003167 A1 | | 1/2008 |
| WO | WO-2012/117986 A1 | | 9/2012 |
| WO | WO-2012/153873 A1 | | 11/2012 |

OTHER PUBLICATIONS

International Search Report in International Application No. PCT/KR2014/009412, filed Oct. 7, 2014.
Office Action dated Jun. 13, 2018 in Japanese Application No. 2016-520598.
Office Action dated Jun. 26, 2018 in Chinese Application No. 201480066993.0, along with its English Translation.

* cited by examiner

LENS MODULE AND LIGHT EMITTING DIODE PACKAGE INCLUDING THE SAME

CROSS-REFERENCE TO RELATED APPLICATIONS

This application is the U.S. national stage application of International Patent Application No. PCT/KR2014/009412, filed Oct. 7, 2014, which claims priority to Korean Application Nos. 10-2013-0119298, filed Oct. 7, 2013, and 10-2013-0148574, filed Dec. 2, 2013, the disclosures of each of which are incorporated herein by reference in their entirety.

TECHNICAL FIELD

Embodiments of the present invention relate to a light emitting diode package and a lens module included in the light emitting device package.

BACKGROUND ART

A light emitting diode (LED) is a semiconductor device that converts electrical energy into light energy. The LED may produce light having various wavelengths (colors) by controlling the components of a compound semiconductor, and the output from the LED may range from red, green, blue-violet and the like. The LED may emit white light having excellent efficiency by combining colors using a fluorescent material.

LEDs, compared with conventional light sources such as a fluorescent lamp, an incandescent lamp and so on, have advantages including lower energy consumption, semi-permanent life span, improved response speed, stability, environmental friendliness and the like. Accordingly, the scope of application for LEDs has been extending to a light-emitting diode backlight to replace a cold cathode fluorescent lamp (CCFL) constituting a backlight of an LCD (Liquid Crystal Display) device, a white light-emitting diode lighting device to replace a fluorescent lamp or an incandescent lamp, a car headlight, a signal lamp and the like.

According to a conventional art, a light emitting device chip is combined with a predetermined package body and resin containing a fluorescent substance is provided on the light-emitting device chip, and a lens is formed on the resin, thereby constituting a light emitting device package.

In particular, since the lens combined with the light emitting device package has a low bonding property with a structure such as an external reflector, a bezel and the like, bonding reliability is ensured by a fixing method using a fixing member with a structure such as a bottom plate and the like for combining the lens with the separate light emitting device package, as a base of lower support. However, it is problematic in that an inconvenient process and an increase in production costs are caused.

DISCLOSURE OF INVENTION

Technical Problem

Embodiments of the inventions are intended to solve the above problems, and an aspect of the present invention provides a lens module that enables the simplification of a structure and a production process by forming connection parts combined with external bezel parts in a lens itself with regard to a lens structure for a light emitting device to easily combine the bezel parts and a lens part even without the element of a separate base plate.

Solution to Problem

According to an aspect of the present invention, there is provided a lens module, including: a lens part; support parts extending from the outside of the lens part; and connection parts formed on the support parts, respectively.

According to another aspect of the present invention, there is provided a light emitting diode package, including: a lens module including a lens part, support parts extending from the outside of the lens part and connection parts formed on the support parts, respectively; a light source module accommodated inside the lens part of the lens module; and bezel parts each having an opening formed at a region corresponding to the lens part of the lens module.

Advantageous Effects of Invention

According to some embodiments of the present invention, with regard to a lens structure for a light emitting diode, as connection parts combined with external bezel parts are formed in a lens itself, the bezel parts and a lens part are easily combined even without the element of a separate base plate so that the structure and a production process can be simplified, and thus a reduction in production costs can be realized.

Also, it is advantageous in that, even though the base plate is provided, the connection parts combined with the base plate are formed in the lens itself so that the light emitting diode package in a structure having more high reliability can be implemented.

MODE FOR THE INVENTION

Figure 1:
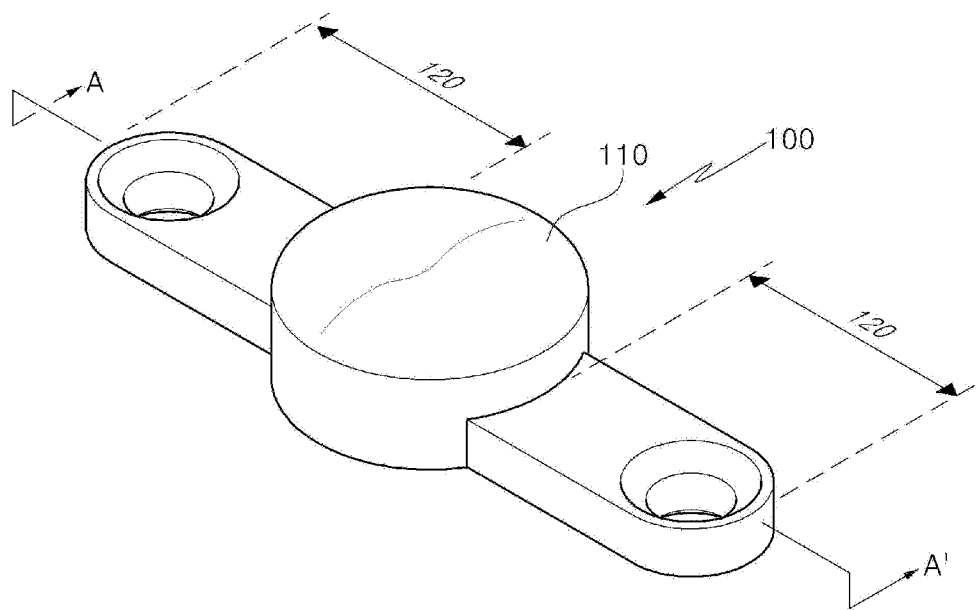
FIG. 1 is a perspective view of a lens module according to a first embodiment of the present invention.

Hereinafter, the configurations and operations according to embodiments of the present invention will be described in detail with reference to the accompanying drawings. Regardless of reference numerals of the drawings, the elements having the similar functions and operations of the drawings are given the same reference numerals. Terms such as a first term and a second term may be used for explaining various constitutive elements, but the constitutive elements should not be limited to these terms. These terms is used only for the purpose for distinguishing a constitutive element from other constitutive element.

The embodiments will be clearly shown based on the accompany drawings and the description of the embodiments. With regard to the description of the embodiments, it will also be understood that when an element is referred to as being "on" another element, substrate, layer, region, pad or pattern, it can be directly on the other element, substrate, layer, region, pad or pattern, or intervening elements may also be present. Further, it will be understood that when an element is referred to as being "under" another element, it can be directly under, or one or more intervening elements may also be present. In the drawings, the thicknesses of layers and regions may be exaggerated for clarity. Hereinafter, the embodiments will be described with reference to the accompanying drawings.

1. First Embodiment

Figure 2:
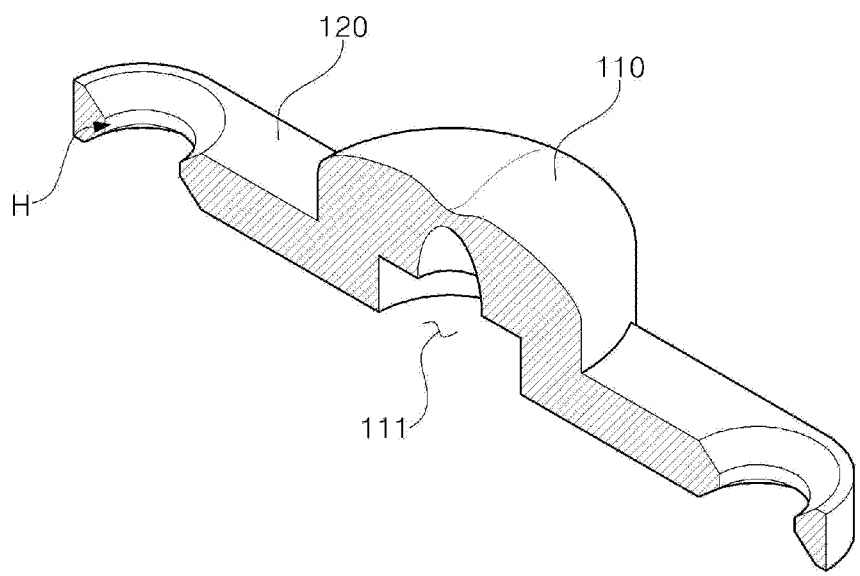
FIG. 2 is a cross-sectional view of the lens module according to the first embodiment taken along lines A-A'.
Figure 3:
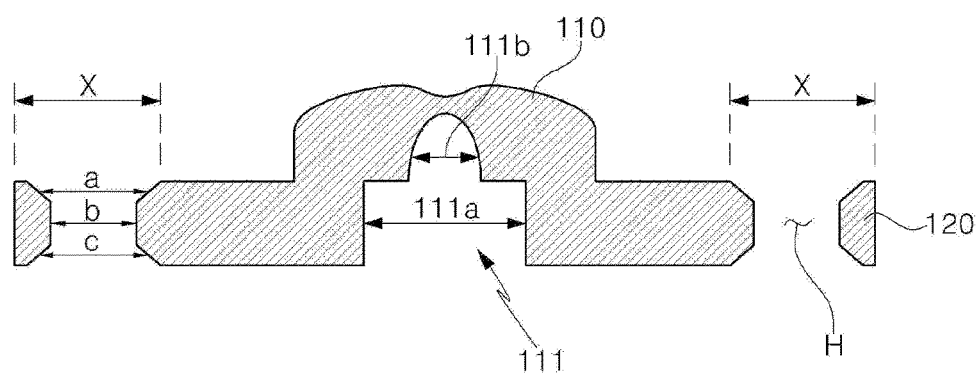
FIG. 3 is a cross-sectional view of the lens module according to the first embodiment of the present invention.

FIG. 1 is a perspective view of a lens module according to a first embodiment of the present invention, FIG. 2 is a cross-sectional view of the lens module of FIG. 1 taken along lines A-A', and FIG. 3 illustrates a plan view for a cross-sectional portion of the lens module of FIG. 2.

Referring to FIGS. 1 to 3, the lens module 100 according to the first embodiment of the present invention may include: a lens part 110; support parts 120 extending from the outside of the lens part 110; through holes H formed at each of the support parts 120.

As illustrated in FIG. 2, the lens part 110 has internally a light source receiving region 111 for receiving a printed circuit board (PCB) to which a light emitting diode is mounted, and includes a lens form having a curvature in a structure which protrudes to the outside so that light received in the light source receiving region 111 can be diffused to the outside.

Also, the lens module 100 may be made using a transparent resin and the lens may include a fluorescent agent. The lens part 110 may be injected and molded with the resin containing the fluorescent agent, or may be produced in such a manner as to apply the fluorescent agent to transparent or translucent resin, glass or film.

Furthermore, even though the light source receiving region 111 inside the lens part 110 may be implemented as a general internal receiving space (cavity), a light emitting diode receiving region 111b may be processed as a cavity having a convex curvature and a PCB receiving region intended for mounting light emitting diodes may be processed as a cavity corresponding to a shape of the PCB.

When the light source receiving region 111 having such a double structure is formed, light penetrates elements having different refractive indexes while penetrating the lens part 110 and the light source receiving region in which an air layer resulting from the light emitting diode will be formed, so that a diffusing and scattering rate of the light can be increased. In addition to this, a diffusing and scattering rate can be further improved by a convex curvature of the light emitting diode receiving region 111b.

The support part 120 may be implemented as a structure in a plate form which extends to be integrally formed with the outside of the lens part 110 and may be implemented in an integral structure with the lens part 110 using an injection molding method.

Of course, after the support part 120 has been produced as a structure separated from the lens part 110, the support part may be combined with the lens part 110.

In particular, as illustrated in FIG. 3, in the present embodiment of the invention, the support part 120 may have a connection part X for connecting the lens part 110 to an outer structure such as a bezel part, a reflector or the like, and the connection part X may include a hole form or may include a protruding structure form in an embodiment which will be described later.

The embodiments of the lens module of FIGS. 1 to 3 show that the connection part X is implemented in the structure of a through hole H that passes through the support part 110.

In particular, as illustrated in FIG. 2, the structure of through hole H may be configured to pass through the support part 110, or may be formed to be tapered from both surfaces of the support part 110 toward a central portion of the through hole.

That is, as illustrated in FIG. 3, it is more preferable that the through hole H be tapered from an upper surface of the support part 120 to portions a, c forming an inclination angle with a central portion b of a thickness of the support part 120. This structure is advantageous in that a bonding force can be improved by enabling a melt bonding surface to extend in a structure in which a melt bonding material is collected along a concave inclination of a tapered portion when an external connection element inserted into the through hole H later is bonded by a hot staking method.

2. Second Embodiment

The second embodiment illustrates an example of the configuration of a light emitting diode package to which the lens module of the first embodiment is applied.

Figure 4:
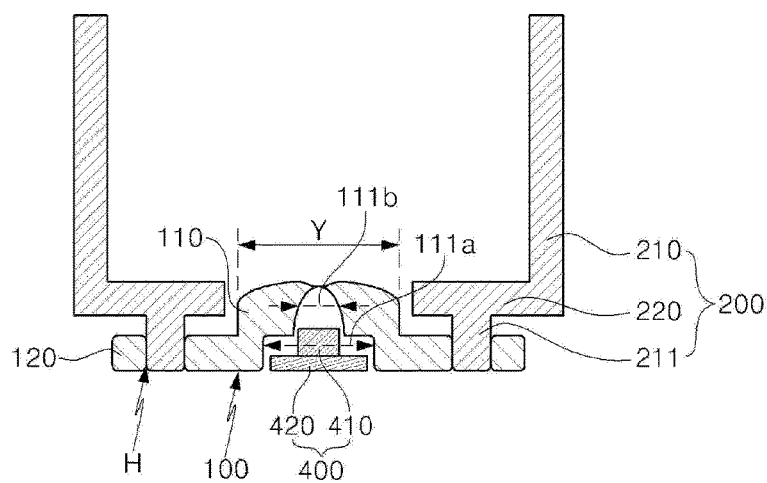
FIGS. 4 and 5 are cross-sectional views of a light emitting diode package according to a second embodiment of the present invention.
Figure 5:
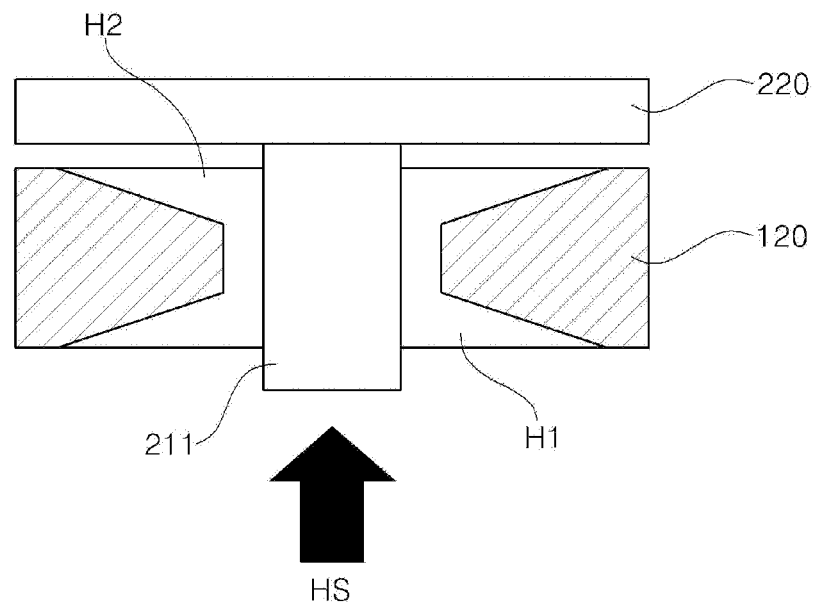

FIGS. 4 and 5 illustrate the configuration of the light emitting diode package according to the second embodiment.

Referring to FIGS. 4 and 5, the light emitting diode package according to the present embodiment of the invention may include the lens module described in the sections regarding FIGS. 1 to 3, and a light source module 400 including a light emitting diode 410 accommodated inside a light source receiving region of the lens module 100, and a printed circuit board (PCB) 420 to which the light emitting diode 410 is mounted, and the light emitting diode package may further include a bezel part 200 having an opening into which the lens part 110 of the lens module 100 can be inserted.

The bezel part 200 may be formed as a reflector having a reflection property. In this case, the bezel part may be made of a material containing at least one of at least one of Ag, Al, Pt, Cr, Ni, a titanium oxide, a silicon oxide, an aluminum oxide, a magnesium fluoride, a tantalum oxide and a zinc oxide, or may be formed as a structure in which the aforesaid material is contained in a substrate, or a structure in which the aforesaid material is coated on a substrate.

The bezel part 200 may include a side portion 210 and a lower surface portion 220 in which a bottom of the side portion 210 is bent, and an upper portion of the bezel part 200 is formed to be open. Moreover, one region of the lower surface portion 220 is open, and the lens part 110 of the lens module may be inserted into an opening position.

In particular, the through hole H of the first embodiment may be formed in the support part 120 of the lens module 100, and the through hole H may be gradually tapered from an upper surface and a lower surface portion to a central portion.

A bezel protrusion part 211 extending from a lower surface portion 220 of the bezel part may be connected to be inserted into the through hole H, and melt bonding of the bezel protrusion part and the through hole may be performed using a hot staking method and the like.

At this time, a melt bonding material is collected in tapered portions H1, H2 of the through hole H so that strong bonding between a surface of the support part of the lens module and a lower surface portion 220 of the bezel part can be realized.

Accordingly, in the embodiment of FIG. 4, there is no need to combine the lens module 100 and the bezel part 200 because the separate support plate is disposed in a lower portion of the lens module 100. Thus, a strong bonding force with the bezel part 200 may be simply implemented by the lens module 100, so that the light emitting diode package having reliability can be implemented at a lower cost.

Also, the light source receiving region 111 having a double structure, in which the light emitting diode receiving region 111b is processed as a cavity having a convex curvature, and the PCB receiving region 111a for mounting the light emitting diode is process as a cavity corresponding to a shape of the PCB, is formed inside the lens module 100, so that light can penetrate constitutive materials having different refractive indexes, thereby increasing a diffusion and scattering rate of the light and further improving the diffusion and scattering rate thanks to the convex curvature of the light emitting diode receiving region 111b.

3. Third Embodiment

Figure 6:
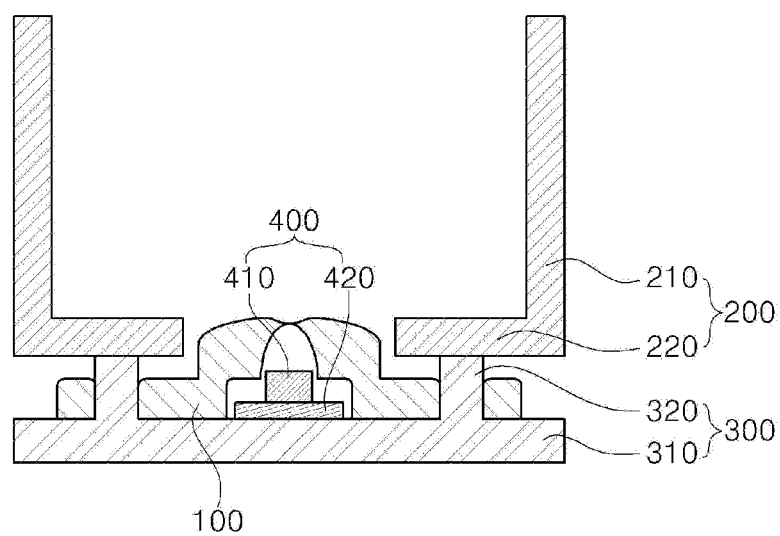
FIGS. 6 and 7 are cross-sectional views of a light emitting diode package according to a third embodiment of the present invention.
Figure 7:
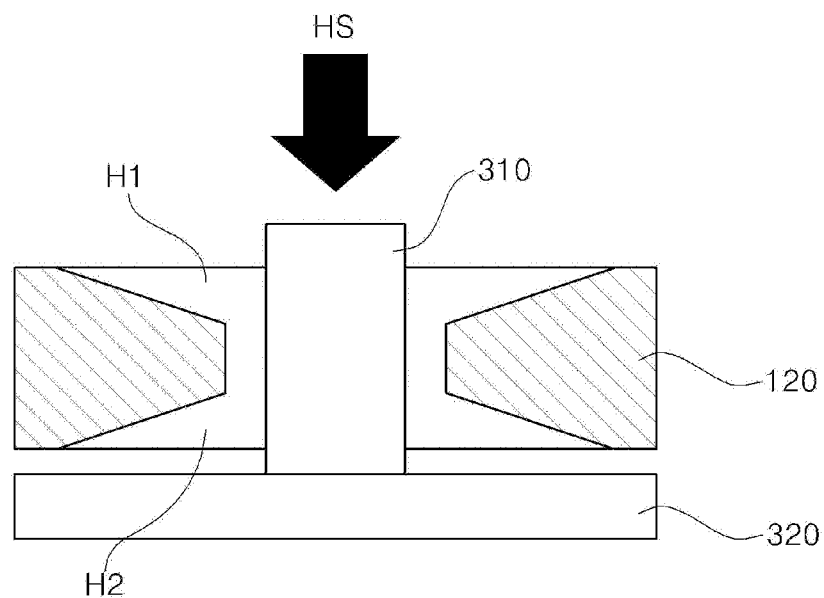

FIGS. 6 and 7 illustrates the third embodiment according to the present invention.

Referring to FIGS. 6 and 7, the third embodiment is similar to the first embodiment, in that the light emitting diode package includes the lens module 100 of the first embodiment of the present invention, and is configured such that the lens module 100 and the bezel part 200 are combined by providing a separate base plate 300.

The base plate 300 is configured such that a plate protrusion part 320 in a protruding form is formed on a substrate 310. Thus, when the plate protrusion part 320 is adhered bonded to the lower surface portion 220 of the bezel part 200 by passing through the through hole H of the lens module 100 and melt-bonding is performed by a hot staking (HS) method, the plate protrusion part 320 is melt-bonded and a melting bonding material is collected in tapered portions H1, H2 of the through hole H so that a surface of the lens module 100 can be strongly bonded to the lower surface portion 220 of the bezel part.

In the third embodiment, compared to the second embodiment, since the base plate 300 is added, the elements are increased. In spite of this face, the third embodiment has a meaning, in that a light source module 400, the lens module 100 and the bezel part 200 can be stably supported from the bottom and can be bonded thanks to the base plate, and the third embodiment is also advantageous in that strong bonding can be realized by applying the lens module according to the first embodiment of the present invention.

In particular, even though it is not illustrated, in the lower surface portion 220 of the bezel part 200, a separate through hole having the same structure as that of the through hole H of the lens module 100 is formed in a position corresponding to the plate protrusion part 320, and a hot staking method is performed after the plate protrusion part 320 has been inserted into the separate through hole so that stronger bonding can be realized.

Of course, in this case, the separate through hole may be tapered in the same manner as the structure of the through hole implemented in the lens module of the present invention.

4. Fourth Embodiment

Figure 8:
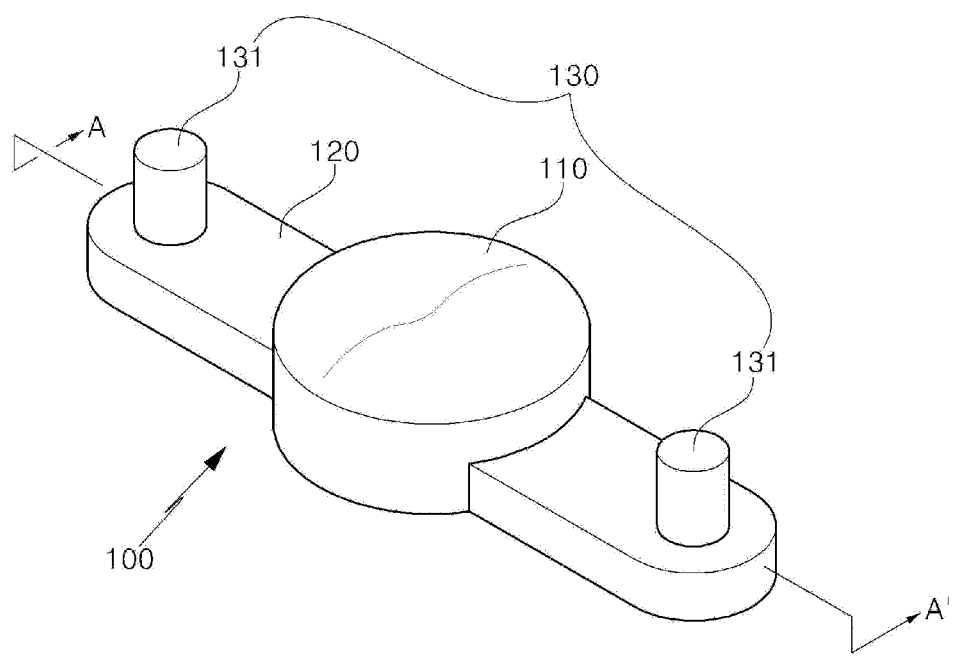
FIG. 8 is a perspective view of a lens module according to a fourth embodiment of the present invention.
Figure 9:
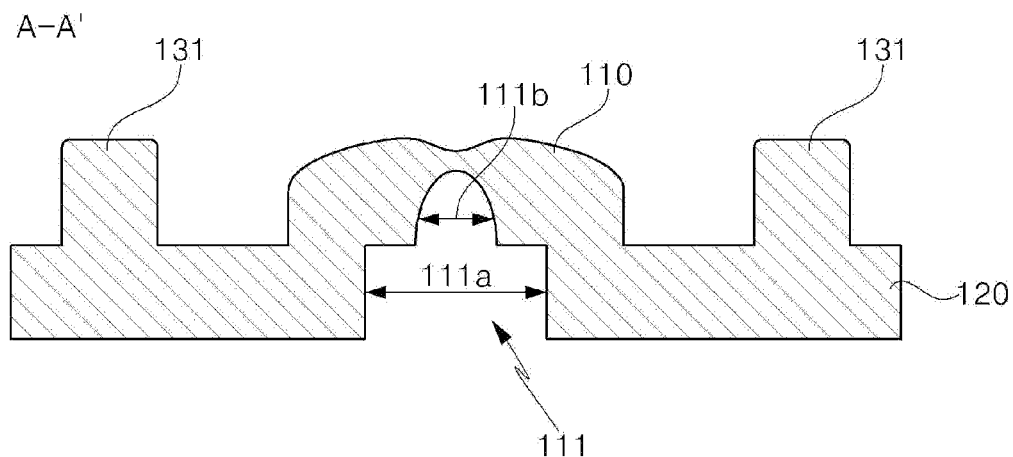
FIG. 9 is a cross-sectional view of the lens module according to the fourth embodiment taken along lines A-A'.

FIG. 8 is a perspective concept view of a lens module according to a fourth embodiment of the present invention. FIG. 9 is a cross-sectional view of the lens module of FIG. 7 taken along lines A-A'.

Referring to FIGS. 8 and 9, the lens module 100 according to the fourth embodiment of the present invention may include: the lens part 110; the support part 120 extending to the outside of the lens part 110; and the protrusion part 130 on the support part 120.

The lens part 110 include the light source receiving region 111 for receiving the printed circuit board in which the light emitting diode is mounted, and has a lens-like shape having a curvature in a structure which protrudes to the outside, so that light accommodated in the light source receiving region 111 can be diffused to the outside.

Also, the lens module 100 may be made of a transparent resin, and the lens module 100 may contain a fluorescent agent. The lens part 110 may be injected and molded using resin containing the fluorescent agent, or may be produced by applying the fluorescent agent to transparent or translucence resin, glass or film.

Furthermore, as illustrated in FIG. 9, the light source receiving region 111 inside the lens part 110 may be implemented as a receiving space (cavity), and the light emitting diode receiving region 111b may be processed as a cavity having a convex curvature and the PCB receiving region 111a may be processed as a cavity corresponding to a shape of the PCB.

When the light source receiving region 111 having such a double structure is formed, light can penetrate elements having different refractive indexes while penetrating the lens part and the light source receiving region 111 having an air layer from the light emitting diode, thereby enabling the improvement of a diffusing and scattering rate of the light and the diffusing and scattering rate to be further improved thanks to the convex curvature of the light emitting diode receiving region 111b.

The support part 120 may be implemented as a structure in a flat form which extends to be integrally formed with the outside of the lens part 110, and may be implemented in an integral structure with the lens part 110 using an injection molding method. Of course, as the support part is produced as a separate structure from the lens part 110, the support may be configured to be combined with the lens part 110.

In particular, the present embodiment of the invention may include the protrusion part 131 which is configured to protrude on the support part 120.

As illustrate in FIGS. 8 and 9, the protrusion part 131 may be formed on one surface which is an upper surface of the support part 120, and the lens part 110 may be formed as a cylindrical structure without being limited thereto. Thus, the lens part may have various prismatic shapes, and a width, a length and number of the protrusion structure and a shape of a cross section of the protrusion structure may be variously changed.

Also, the protrusion part 131 may be coupled to a connection hole or a connection part using an insertion or melt bonding method and the like The lens module according to the fifth embodiment of the present invention is advantageous in that a production process can be simplified because a connection member is provided at the lens module so that a combination with an object to be combined can be easily performed without a separate outer element.

5. Fifth Embodiment

Figure 10:
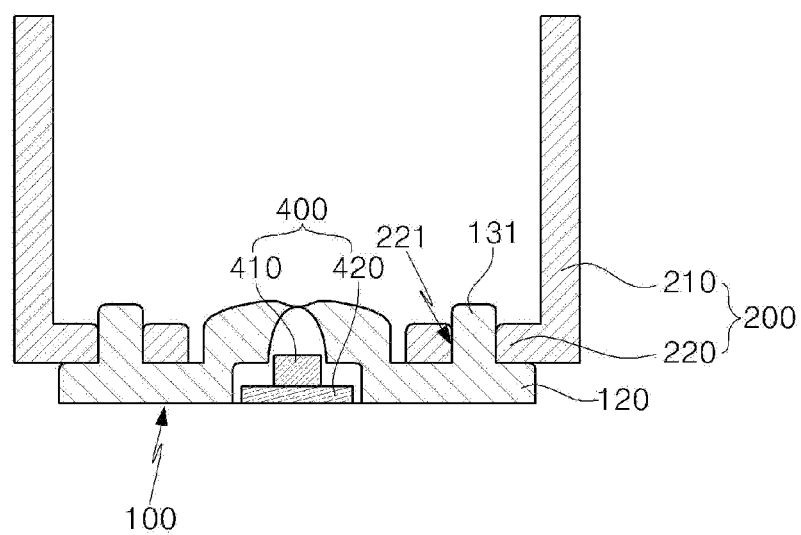
FIGS. 10 and 11 are cross-sectional views of a light emitting diode package according to a fifth embodiment of the present invention.
Figure 11:
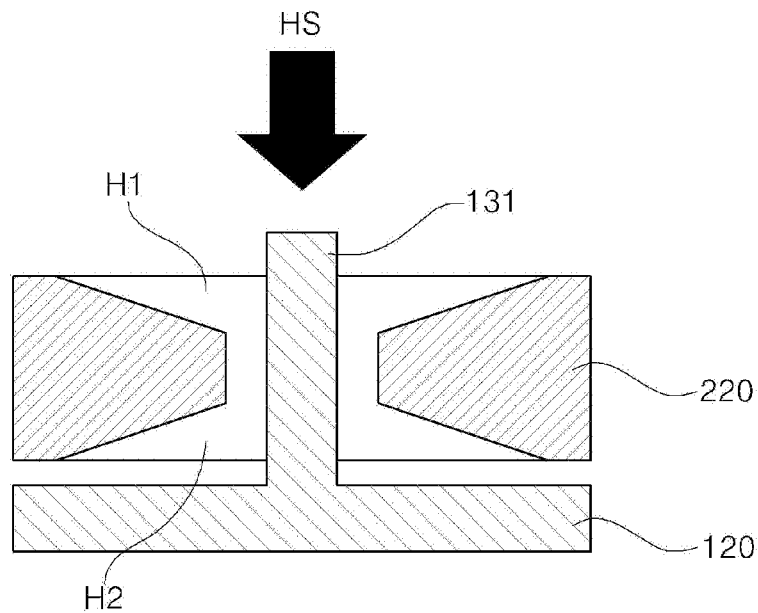

FIGS. 10 and 11 illustrate the embodiment of a light emitting diode package to which the structure of the lens module according to a fifth embodiment of the present invention is applied.

As illustrated in FIG. 10, the lens module 100 according to the fourth embodiment of the present invention in FIG. 8 may have the protrusion part 131 on a surface of the support part 120, and in the present embodiment, a structure in which the protrusion part 131 is only provided on an upper surface of the support part 120 is described and in the sections regarding embodiments which will be described later, modified structures will be described.

As illustrated in FIG. 10, the light emitting diode package to which the lens module according to the fifth embodiment of the present invention is applied may include the lens module 100 and the light source module 400 including the light emitting diode 410 accommodated inside a light source receiving region of the lens module 100, and the printed circuit board 420 to which the light emitting diode 410 is mounted, and the light emitting diode package may further include the bezel part 200 having an opening into which the lens part 110 of the lens module 100 can be inserted.

The bezel part may be formed as a reflector having a reflection property. In this case, In this case, the bezel part may be made of a material containing at least one of at least one of Ag, Al, Pt, Cr, Ni, a titanium oxide, a silicon oxide, an aluminum oxide, a magnesium fluoride, a tantalum oxide and a zinc oxide, or may be formed as a structure in which the aforesaid material is contained in a substrate, or a structure in which the aforesaid material is coated on a substrate.

The bezel part 200 may include a side portion 210 and a lower surface portion 220 formed to be bent from a bottom of the side portion 210, and an upper portion of the bezel part has an open structure.

Moreover, one area of the lower surface portion 220 is open, and accordingly, the lens part 110 of the lens module 100 is inserted into the lower surface portion 220 via the open area.

Also, a bezel through-hole 221 may be formed in the lower surface portion 220 of the bezel part 200 so that the protrusion part 131 of the lens module can be inserted, and the lens module 100 and the bezel part 200 may be bonded by a hot staking method after and the protrusion part 131 of the lens module 100 has been inserted into and connected to the bezel through hole 221, In the illustrated embodiment, even though the bezel through hole 221 is implemented to pass through the lower surface portion 220 of the bezel part 200, according to circumstances, the bonding portion may be implemented in a structure in which a pattern in a concave groove form is formed, rather than the structure in which the bezel through hole passes through the lower surface portion.

In this case, as illustrated in FIG. 11, the bonding portion 221 in a hole structure provided at the lower surface portion 220 of the bezel part 200 may be configured to have the portions H1, H2 that are gradually tapered from one surface or both surfaces of the lower surface portion 220 of the bezel part 200 to a central portion thereof.

This is also intended to realize a strong bonding force as a melt boding solution is collected in the regions having a tapered structure upon hot staking of the protrusion 131.

When the lens module 100 of the fifth embodiment is applied, there is a need to dispose a separate support plate in a lower portion of the lens module upon bonding the lens module 100 and the bezel part 200. Thus, a strong bonding force with the bezel part 200 can be simply realized by the lens module 100 so that the light emitting diode package having reliability can be realized at a lower cost.

6. Sixth Embodiment

Figure 12:
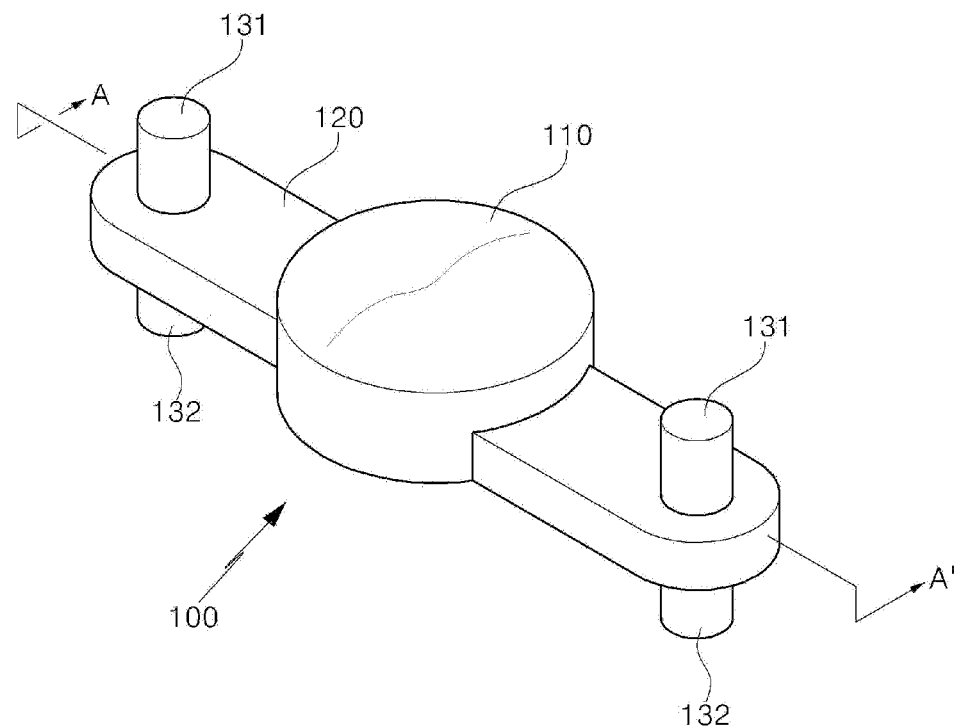
FIG. 12 is a perspective view of a lens module according to a sixth embodiment of the present invention.

The lens module illustrated in FIG. 12 has a modified structure of that of the fourth embodiment and is different from that of the fourth embodiment, in that the protrusion parts 131, 132 are formed on one surface of the support part 120 and another surface opposite to the one surface, respectively.

That is, the first protrusion part 131 is formed on the upper surface of the support part 120, and the second protrusion part 132 is formed on the lower surface of the support part 120.

Accordingly, the first protrusion 131 may be combined with the bezel part 200 as described in the sections regarding FIG. 10, and the second protrusion 132 may be bonded to the base plate 300 which is an external structure.

Figure 13:
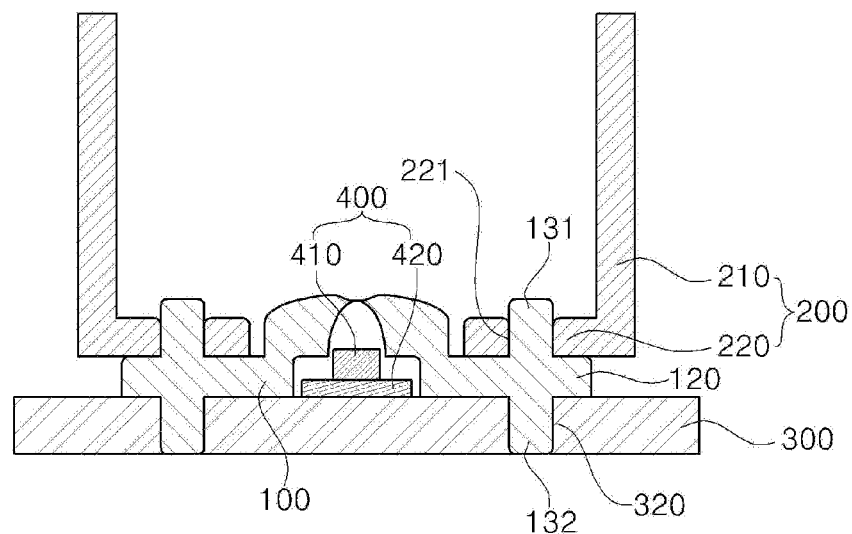
FIGS. 13 and 14 are cross-sectional views of a light emitting diode package according to the sixth embodiment of the present invention.

FIG. 13 shows the light emitting diode package to which the lens module 100 presented in FIG. 12 is applied and the light emitting diode package has a difference, in that the second protrusion part 132 is added to the lower surface of the support part 120 of the lens module 100.

In particular, as illustrated in FIGS. 12 and 13, the first protrusion part 131 of the lens module 100 is bonded to the lower surface of the bezel part 200 as shown in the embodiment of FIG. 10, and the plate through-hole 320 of the base plate 300 is formed so that the second protrusion part 132 of the lens module 100 can be combined with the plate through hole 320 in such a manner as to pass through the plate through hole 320. When melt boding is performed using a hot staking method, the base plate 300 and the bezel part 200 located at the upper portion are bonded via the lens module so that stronger bonding can be realized.

Figure 14:
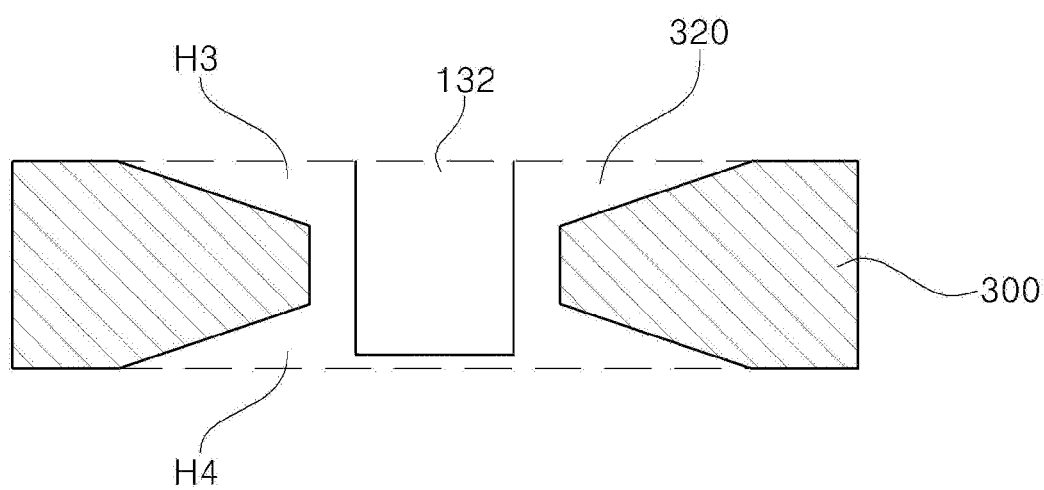

At this time, as illustrated in FIG. 14, the plate through-hole 320 provided at the base plate 300 may be implemented to be gradually tapered toward the central portion thereof. A melt bonding material is collected in tapered portions H3, H4 of the plate through-hole 320 so that the surface of the lens module 100 and the lower surface portion 220 of the bezel part 200 can be strongly bonded.

That is, the plate through hole 320 of the present invention may be formed to be tapered toward a central portion of the base plate 300. In another embodiment, the plate through-hole 320 may be formed in a concave pattern structure.

In the sixth embodiment, compared to the fifth embodiment, even though the base plate 300 is added, it is advantageous in that the light source module 400, the lens module 100 and the bezel part 200 can be stably supported and bonded, and that stronger bonding can be realized by applying the lens module according to the fourth embodiment.

7. Seventh Embodiment

Figure 15:
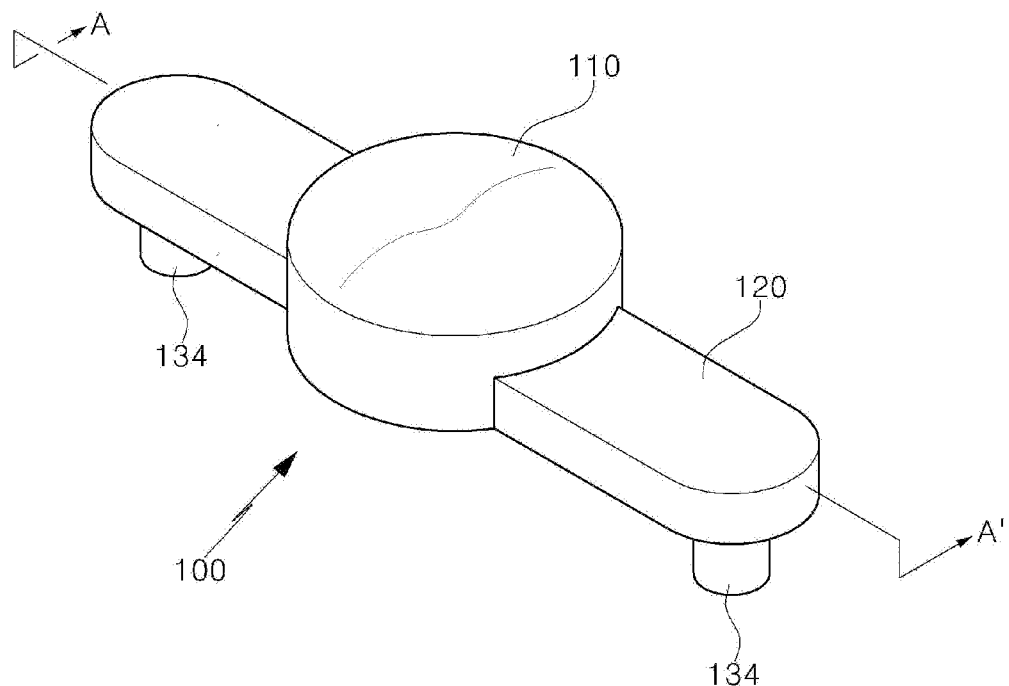
FIG. 15 is a perspective view of a lens module according to a seventh embodiment of the present invention.
Figure 16:
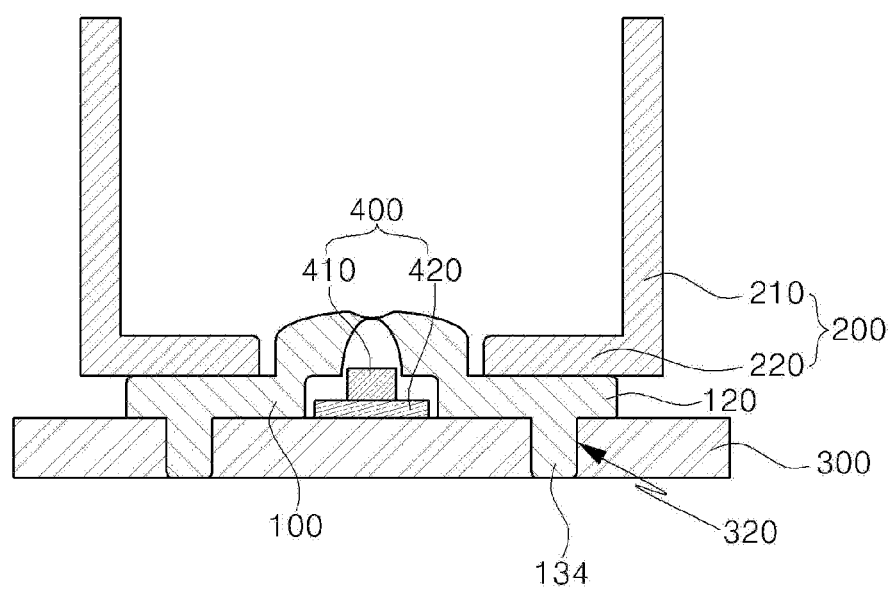
FIG. 16 is a cross-sectional view of a light emitting diode package according to the seventh embodiment of the present invention.

The seventh embodiment illustrated in FIGS. 15 and 16 is identical to the other embodiments, in that the lens 110 and the support part 120 are provided, but is different from the other embodiments, in that a second protrusion part 134, which is a protruding structure, is only formed on a lower surface portion of the support part 120.

At this time, the seventh embodiment has a structure in which the lens module 100 and the bezel part 200 are bonded using an adhesive material, and this structure may be applied to a case for which a more strong bonding force between the lens module 100 and the base plate 300 of a lower portion is needed.

As illustrated in FIG. 16, the light emitting diode package to which the seventh embodiment is applied may be configured such that the second protrusion part 134 is inserted into and welded in the plate through hole 320 of the base plate 300, and the plate through hole 320 is formed to be gradually tapered toward a central portion thereof.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A lens package, comprising:
a base plate; and
a lens module on the base plate,
wherein the lens module comprises:
a lens part;
a first support part extending in a first lateral direction away from the lens part;
a first protrusion part extending from a lower surface of the first support part into a first through hole of the base plate;
a second support part extending in a second lateral direction away from the lens part; and
a second protrusion part extending from a lower surface of the second support part into a second through hole of the base plate,
wherein the first protrusion part and the second protrusion part are welded to the base plate,
wherein the first support part and the second support part each includes an adjacent end, a distal end, and a central portion disposed between the adjacent end and the distal end;
wherein the distal end of the first support part extends away from the lens part in the first lateral direction and has a first edge, and the distal end of the second support part extends away from the lens part in the second lateral direction and has a second edge;
wherein the adjacent ends of the first support part and the second support part are disposed adjacent to the lens part,
wherein the central portions of the first support part and the second support part each has a constant width, and the widths of the central portions of the first support part and the second support part are smaller than a diameter of the lens part;
wherein the adjacent ends of the first support part and the second support part each has a constant width, and the widths of the adjacent ends of the first support part and the second support part are smaller than a diameter of the lens part; and wherein the lens part has a shape of a circular cylinder and has an axis perpendicular to the first lateral direction and the second lateral direction.

2. The lens package of claim 1,
wherein the first protrusion part is positioned on the lower surface of the first support part and is spaced apart from the first edge, and
wherein the second protrusion part is positioned on the lower surface of the second support part and is spaced apart from the second edge.

3. The lens package of claim 1, wherein the lower surface of the first support part and the lower surface of the second support part are in direct contact with the base plate.

4. The lens package of claim 1, wherein a lower surface of the lens part is in parallel to the lower surface of the first support part and the lower surface of the second support part.

5. The lens package of claim 1, wherein a length of the first support part in the first lateral direction is greater than a radius of the lens part.

6. The lens package of claim 1, wherein the first lateral direction is opposite to the second lateral direction.

7. The lens package of claim 1, wherein the first protrusion part is welded to the base plate in the first through hole, and wherein the second protrusion part is welded to the base plate in the second through hole.

8. The lens package of claim 1, wherein the first protrusion part extends completely through the first though hole, and wherein the second protrusion part extends completely through the second though hole.

9. The lens package of claim 1, wherein the first protrusion part is in direct contact with an inner surface of the first through hole.

10. A lens package, comprising:
a base plate; and
a lens module,
wherein the lens module comprises:
a lens part;
a first support part extending away from the lens part;
a first protrusion part extending from a lower surface of the first support part into a first through hole of the base plate;
a second support part extending away from the lens part; and
a second protrusion part extending from a lower surface of the second support part into a second through hole of the base plate,
wherein the first support part and the second support part each includes an adjacent end, a distal end and a central portion disposed between the adjacent end and the distal end;
wherein the distal end of the first support part extends away from the lens part in a first lateral direction and has a first edge, and the distal end of the second support part extends away from the lens part in a second lateral direction and has a second edge,
wherein the adjacent ends of the first support part and the second support part are disposed adjacent to the lens part,
wherein the central portions of the first support part and the second support part each has a constant width, and the widths of the central portions of the first support part and the second support part are smaller than a diameter of the lens part;
wherein the adjacent ends of the first support part and the second support part each has a constant width, and the widths of the adjacent ends of the first support part and the second support part are smaller than a diameter of the lens part;

wherein the lens part has a shape of a circular cylinder and has an axis perpendicular to the first lateral direction and the second lateral direction, wherein the first protrusion part is positioned on the lower surface of the first support part and is spaced apart from the first edge, wherein the second protrusion part is positioned on the lower surface of the second support part and is spaced apart from the second edge, and wherein the shortest distance from the first protrusion part to the second protrusion part is greater than a diameter of the lens part and smaller than the shortest distance from the first edge to the second edge.

11. The lens package of claim 10, wherein half of the shortest distance from the first edge to the second edge is greater than the diameter of the lens part.

12. The lens package of claim 10, wherein the lens part comprises a light source receiving region formed in a central portion inside the lens part.

13. The lens package of claim 12, wherein the light source receiving region comprises: a first receiving region for receiving a light emitting diode; and a second receiving region.

14. The lens package of claim 13, wherein a diameter of the first receiving region is smaller than that of the second receiving region.

15. The lens package of claim 12, further comprising a light emitting diode disposed on the base plate and within the light source receiving region of the lens part.

16. The lens package of claim 10, wherein the first lateral direction is opposite to the second lateral direction.

17. The lens package of claim 10, wherein the first support part has a plate shape, wherein the lower surface of the first support part is flat.

18. The lens package of claim 10, wherein the lower surface of the first support part is in direct contact with the base plate.

19. The lens package of claim 17, wherein the first support part comprises a flat top surface.

20. The lens package of claim 10, wherein the shortest distance from a top surface of the lens part to a top surface of the base plate, measured in a third direction perpendicular to the top surface of the base plate, is greater than the shortest distance from a top surface of the first support part to the top surface of the base plate.

21. The lens package of claim 10, wherein the shortest distance from a top surface of the lens part to a top surface of the base plate, measured in a third direction perpendicular to the top surface of the base plate, is greater than the shortest distance from a top surface of the first support part to the top surface of the base plate, and wherein the shortest distance from the top surface of the lens part to a top surface of the base plate, measured in the third direction, is greater than the shortest distance from a top surface of the second support part to the top surface of the base plate.

22. The lens package of claim 10, wherein the first support part is integrally formed with the lens module.

23. The lens package of claim 22, wherein the first support part is formed with the lens module by an injection molding method.

24. The lens package of claim 10, wherein the first support part and the second support part are integrally formed with the lens module.

25. The lens package of claim 24, wherein the first support part and the second support part are formed with the lens module by an injection molding method.

26. The lens package of claim 10, wherein the first protrusion part is in direct contact with an inner surface of the first through hole.

27. The lens package of claim 10, wherein the first through hole tapers from a top surface of the base plate towards a central portion of the first through hole.

28. A lens, comprising:
a lens part;
a first support part extending away from the lens part;
a first protrusion part extending in a first direction from a lower surface of the first support part;
a second support part extending away from the lens part; and
a second protrusion part extending in a second direction from a lower surface of the second support part,
wherein the first support part and the second support part each includes an adjacent end, a distal end and a central portion disposed between the adjacent end and the distal end;
wherein the distal end of the first support part extends away from the lens part in the first lateral direction and has a first edge, and the distal end of the second support part extends away from the lens part in the second lateral direction and has a second edge,
wherein the adjacent portions of the first support part and the second support part are disposed adjacent to the lens part,
wherein the central portions of the first support part and the second support part each has a constant width, and the widths of the central portions of the first support part and the second support part are smaller than a diameter of the lens part;
wherein the adjacent ends of the first support part and the second support part each has a constant width, and the widths of the adjacent ends of the first support part and the second support part are smaller than a diameter of the lens part;
wherein the lens part has a shape of a circular cylinder and has an axis perpendicular to the first lateral direction and the second lateral direction, and
wherein the lower surface of the first support part between the first protrusion part and the first edge is perpendicular to the first direction.

* * * * *